United States Patent
McDonald et al.

(10) Patent No.: US 6,934,026 B2
(45) Date of Patent: Aug. 23, 2005

(54) MAKING DYE MIXTURES TO PRODUCE A CERTAIN TARGET COLOR

(75) Inventors: Roderick McDonald, Strathcylde (GB); Robert Dornan, Strathclyde (GB)

(73) Assignee: J & P Coats Limited, Glasgow Strathclyde (GB)

( * ) Notice: Subject to any disclaimer, the term of this patent is extended or adjusted under 35 U.S.C. 154(b) by 277 days.

(21) Appl. No.: 10/257,188

(22) PCT Filed: Apr. 12, 2001

(86) PCT No.: PCT/GB01/01644

§ 371 (c)(1),
(2), (4) Date: Feb. 25, 2003

(87) PCT Pub. No.: WO01/79356

PCT Pub. Date: Oct. 25, 2001

(65) Prior Publication Data

US 2003/0172477 A1 Sep. 18, 2003

(30) Foreign Application Priority Data

Apr. 13, 2000 (GB) .............................. 0009011

(51) Int. Cl.$^7$ ................................. G01J 3/50
(52) U.S. Cl. ...................... 356/402; 356/407
(58) Field of Search ................ 356/402, 405, 356/406, 407, 425; 8/400

(56) References Cited

U.S. PATENT DOCUMENTS

| 5,023,814 A | | 6/1991 | Guillemin | |
|---|---|---|---|---|
| 5,402,362 A | * | 3/1995 | Prosser | ................... 356/408 |

FOREIGN PATENT DOCUMENTS

| EP | 0 360 738 A1 | 3/1990 |
|---|---|---|
| EP | 0 446 168 A1 | 9/1991 |
| EP | 0 527 108 A2 | 2/1993 |
| GB | 2 192 455 A | 1/1988 |
| JP | 62142242 | 6/1987 |
| WO | WO 89/09383 | 10/1989 |

* cited by examiner

Primary Examiner—F. L. Evans
(74) Attorney, Agent, or Firm—Alston & Bird LLP

(57) ABSTRACT

A method for making a dye mixture to produce a target colour on a given substrate, comprising the steps of: –a) measuring reflectance values $R_T(\lambda_i)$ of the target colour at a plurality of wavelengths $\lambda_i=1, 2 \ldots n$; b) measuring reflectance values $R_s (\lambda_i)$ of the substrate at the same wavelengths $\lambda_i$; forming a set of concentrations $c_j$ of M dyes in the calculated concentrations; the database having been compiled by aa) making dyeings of combinations of the dyes Dn at different concentrations; bb) measuring the reflectance values R of the dyeings at different wavelengths; cc) defining a function f(R); dd) defining a relationship between f(R) and c involving constants g and k; and ee) for each dye Dn determining constants $g_n$, $k_n$, such that the calculated values for f(R), c, $g_n$ $k_n$ approximate closely the measured values.

12 Claims, No Drawings

MAKING DYE MIXTURES TO PRODUCE A CERTAIN TARGET COLOR

FIELD OF THE INVENTION

This invention relates to dye formulation.

BACKGROUND OF THE INVENTION

In the industry of dyeing materials, particularly textiles, the requirements for producing colour matches are becoming more stringent and the work entailed in formulating the requisite dye mixes more labourious and time consuming. To reduce the amount of work required to produce the requisite dye mixes, methods have been evolved intended to predict, from measurement of the target colour, the dye mixture capable of producing this colour.

The usual known method of making such a prediction is, first of all, to make a selection of dyes likely to produce the target colour, then apply each dye to a given substrate with different concentrations covering the range of working concentrations normally used. Usually at least six different concentrations are used.

The reflectance values of the different dyed samples at the different concentrations are measured using a reflectance spectrophotometer. The measurements are made at different wavelengths spread over the normal visible wavelength range. Suitable wavelength intervals are intervals of 20 nanometers over the range of wavelengths 400 to 700 nanometers.

The reflectance values for each dye at each concentration and each wavelength are usually each converted to a function of reflectance, and the relationship of each function of reflectance value against dye concentration is obtained.

An estimate of the reflectance value of an arbitrarily chosen mixture of the single dyes is made from the functions of reflectance relationships of the single dye samples. From these functions of reflectance relationships, and making allowance for the reflectance value of the undyed substrate, the tristimulus values of the colour produced by the arbitrary mixture are obtained, usually in the form XYZ values as defined by the Commission Internationale d'Eclairage (CIE).

These tristimulus values are compared with tristimulus values obtained experimentally from the given colour and if the two sets of tristimulus values are sufficiently close together then the dye formulation as represented by the arbitrary concentrations chosen is considered to provide a match. If the two sets of tristimulus values are not sufficiently close together to give an acceptable match then a new dye mixture having the same single dyes but with different concentrations is formulated and the tristimulus values of the new dye mixture are compared with the tristimulus values of the target colour. This operation is repeated until the match is considered to be satisfactory.

In practice there is usually a non-linear relationship between reflectance values and the concentrations of dyes giving these reflectance values. This is because, as the dye concentration in a mixture is increased, there is usually a tendency for less dye to pass on to the substrate and more to be retained in the dye bath. This non-linear relationship makes it hazardous to perform dye mixture predictions by interpolation of the single dye reflectance against single dye concentration relationships.

The known method described above produces a success rate of dye prediction of normally around 40–60% i.e. about 40–60% of the predictions made produce dye mixtures which are considered to give satisfactory matches to target colours. However, the large percentage of predictions which do not provide a sufficiently close match makes it necessary under present practice to make trial dyeings of each predicted mixture and correct the trial dye mixtures several times if necessary if these are found to provide an unsatisfactory match.

Another serious difficulty arises when attempts are made to predict dye mixes on the basis of measurements made on single dyes. This is because, frequently, one dye will change the dyeing ability of another dye with which it is mixed, and thus no matter how accurately the dyeing behaviour of any single dye is known it is almost certain that this dye when mixed with other dyes will not behave exactly as it does when used alone. The presence of the substrate and/or changes in the characteristics can also affect the behaviour of dyes whether singly or in admixture.

The methods customary in the art for predicting a dye mixture to provide a given target colour take no account of the interactions of single dyes when these are mixed and there is no obvious way of improving their accuracy of prediction.

It would be of great advantage in the dyeing industry to have a method of formulating dye mixtures to produce given colours on given substrates by prediction, using, as the starting point, dye samples actually produced in the factory or produced from dye mixtures in the laboratory under conditions as closely related to factory conditions as possible, if such a method would have a much greater success rate in producing dye mixture predictions.

SUMMARY OF THE INVENTION

The present invention provides a simplified method of formulating such dye mixtures with a success rate not only high enough to eliminate much of the need for test dyeings but also capable of being progressively improved.

The invention comprises a method for making a dye mixture to produce a target colour on a given substrate, comprising the steps of:

a) measuring reflectance values $R_T(\lambda_i)$ of the target colour $\lambda$ at a plurality of wavelengths $\lambda_i$, i=1, 2 . . . n;

b) measuring reflectance values $R_S(\lambda_i)$ of the substrate s at the same wavelengths $\lambda_i$;

c) forming a set of concentrations $c_j$ of M dyes, j=1, 2, . . . M from a database of N dyes Dn, n=1, 2, . . . N with associated constants $g_n$, $k_n$;

d) making dye mixtures using the M dyes in the calculated concentrations; the database having been compiled by aa) making dyeings of combinations of the dyes Dn at different concentrations;

bb) measuring the reflectance values R of the dyeings at different wavelengths;

cc) defining a function f(R);

dd) defining a relationship between f(R) and c involving constants g and k; and ee) for each dye Dn determining constants $g_n$, $k_n$ such that the calculated values for f(R), c, $g_n$, $k_n$ approximate closely the measured values.

The function f(R) may be the algorithm known as the Kubelka-Munk conversion in which $$f(R) = \frac{(1-R)^2}{2R}$$

but other modes of conversion may be used such as the Chandrasekhar conversion.

The relationship between the function of reflectance of a dye and its respective concentration incorporating two constants may take different forms. One suitable form is $$f(R) = \frac{gc}{1+kc}$$

where g and k are the two constants.

The numerical values of the two constants g and k may initially be arbitrarily chosen and afterwards corrected experimentally.

The constant g may be described as the product of the ratio of the uptake by the substrate of each individual dye to the concentration of the individual dyes added initially to the dye bath and the absorptivity of the dye as expressed by the absorption co-efficient of the dye which can be found by measuring the amount of light absorbed by the dyed substrate per unit concentration of the dye. The constant k expresses the deviation from linearity of the relationship between the uptake of each individual dye by the substrate and the concentration of the dye as added initially to the dye bath.

Taking into account the reflectance of the substrate and extending the formula to a mixture of dyes the latter formula becomes $$f(R) - f(R_S) = \frac{g_1 c_1}{1 + k_1 c_1} + \frac{g_2 c_2}{1 + k_2 c_2} + \frac{g_3 c_3}{1 + k_3 c_3} + \ldots$$

where the suffix numeral identifies the respective constituent dye.

The tristimulus values of the colour may conveniently be the XYZ values of the colour as defined by the CIE.

The XYZ values where these values are used as the tristimulus values may be obtained from the following relationship as defined by the CIE

| | |
|---|---|
| X = ΣREx | each |
| Y = ΣREy | summed over all said |
| Z = ΣREz | wavelengths | where E is the optical distribution of the chosen light source (e.g. daylight, or other light source) as defined by the CIE and

| | |
|---|---|
| x (red) | are coefficients defined by the |
| y (green) | CIE based on the colour vision |
| z (blue) | of a standard observer for red, green and blue light |

The values of E, x, y and z are obtainable from published tables.

The method of the invention also includes the additional steps of regularly updating and correcting the information in the database by using an information feedback or interative process, in which the two constants for each individual dye in a given dye mixture at each wavelength are regularly made more accurate, as well as being updated to take account of changes in dye technique and changes in the physical characteristics of the individual dyes used in the dye mixtures and the substrate. The additional steps are performed as increasing numbers of different colours are produced resulting in increasing numbers of samples. Reflectance values of the new dye mixtures are obtained, and, from them, there are derived by the method described, fresh constants. Because of the greater number of samples, the constants become more accurate. If there are changes in the characteristics of the dyes used, or changes in the dyeing methods, the constants become progressively more up to date. Initially, in the early stages of building the database, the reflectance values combined as described may also include some of the reflectance values already in the database if such reflectance values have also been stored. This is desirable if only a few new reflectance values are available but as larger numbers of dye mixture reflectance values become available from the dyehouse the original reflectance values stored in the database are discarded and the new values put into the database for future use. These constants will in turn be discarded as new and additional dye samples become available. The repetition of this process with ever larger numbers of dye samples during the making of which dye characteristics change or dye techniques are changed ensures that the method of dye prediction is not only kept up to date with changes in the dyeing operation but also becomes more and more accurate and gives better colour matches.

DETAILED DESCRIPTION OF PREFERRED EMBODIMENTS

For a better understanding of the invention a more detailed description of the method of the invention will now be given. In the following description the different dye mixtures containing different combinations of constituent dyes are named A, B, C . . . and the different concentrations of constituent dyes of each dye mixture are numbered 1, 2, 3 . . . so that for example A1 and A2 are dye mixtures containing the same constituent dyes in different concentrations.

The preparation of the database begins by making a number of dye mixtures A, B, C . . . containing different combinations of different colours at different combinations 1, 2, 3 . . . so that there are formed dye mixtures A1, A2, A3 . . . B1, B2, B3 . . . etc. Pieces of a given substrate are dyed with these colour mixtures and the reflectance value R of each sample is measured at several, usually 16, different wavelengths across the visible spectrum, say at 20 nanometer intervals from a lower wavelength of 400 nanometers to an upper wavelength of 700 nanometers. Said reflectance values are now converted to functions of reflectance f(R), for example by the algorithm $$f(R) = \frac{(1-R)^2}{2R}.$$

The reflectance values $R_s$ of the undyed substrate at the same wavelengths are measured and also converted to functions of reflectance $f(R_s)$ using the same algorithm. The relationship of the true reflectance values of all the dye mixtures A1, A2, A3 . . . to the concentrations 1, 2, 3 . . . of each constituent dye at each said wavelength is expressed by an algorithm incorporating two constants g, k for each constituent dye at each said wavelength. The algorithm may be that set out previously, viz.

$$f(R) - f(R_S) = \frac{g_1 c_1}{1 + k_1 c_1} + \frac{g_2 c_2}{1 + k_2 c_2} + \frac{g_3 c_3}{1 + k_3 c_3} + \qquad (1)$$

where the suffixes 1, 2, 3 ... represent respective constituent dyes 1, 2, 3 ... of the dye mixture.

From the experimentally derived values of $f(R)-f(R_S)$ of all the previously prepared dye mixtures and the concentrations $c_1, c_2, c_3$ ... of the constituent dyes the equation (1) is solved by iterative methods such as that known as polytope to give values of g and k for each dye at each wavelength. If there are three dyes forming a ternary dye mixture and the reflectance values are measured at 16 different wavelengths there will now be six constants for each dye mixture (two for each constituent dye) at each of 16 wavelengths giving a total of 96 constants for each dye mixture A, B, C ... The constants are virtually independent of dye concentration.

These constants with their respective dye mixtures are stored in the database for further use in formulating dye mixtures to produce other colours. The respective reflectance values and the dye concentrations of said other colours may also be stored.

The constants are regularly made more accurate and updated as the range of colours made in the dyehouse is increased. This is done by the feedback of information from the dyehouse. As larger numbers of colours are made from each combination A, B, C ... of individual dyes, the different reflectance values obtained for each dye mixture. A, B, C ... are used in the algorithm (1) above with the respective dye concentrations to provide new and updated g and k constants for each constituent dye at each wavelength.

To find a dye mixture to match a given target colour on a given substrate, the reflectance value of the target colour at each wavelength of said range of wavelengths is found experimentally.

The tristimulus values of the target colour, conveniently in terms of XYZ values as defined by the CIE are found from the expression already described X=ΣREx
Y=ΣREy
Z=ΣREz Now the reflectance value ($R_S$) of the given substrate at each of said wavelengths is found and converted to a function of reflectance and the dye mixture A or B or C or ... likely to be capable of providing the target colour is chosen, the constants g and k for each constituent dye at each of said wavelengths are extracted from the database and inserted in the expression $$f(R) - f(R_S) = \frac{g_1 c_1}{1 + k_1 c_1} + \frac{g_2 c_2}{1 + k_2 c_2} + \frac{g_3 c_3}{1 + k_3 c_3} + ...$$

along with arbitrarily chosen concentrations $c_1, c_2, c_3$ ... of the constituent dyes and $f(R)-f(R_S)$ for each wavelength is thus found. Knowing $f(R_S)$ at each wavelength $f(R)$ at each wavelength is found and converted to R using the expression $$f(R) = \frac{(1-R)^2}{2R}.$$

From the values of R at all wavelengths the XYZ values of the proposed dye mixture are found from
X=ΣREx
Y=ΣREy
Z=ΣREz The XYZ values of the target colour and of the proposed dye mixture are compared and if they are acceptably close the concentrations $c_1, c_2, c_3$ arbitrarily chosen are used to make the required dye mixture. If the two XYZ values differ from one another by an unacceptable amount new values of $c_1, c_2, c_3$ are chosen and the operation repeated until a good match is obtained.

It is possible to make a close assessment of the new values required for $c_1, c_2,$ and $c_3$ after the initial values have been tried by considering that the unacceptable values of XYZ for the proposed dye mixture would agree with the XYZ values of the target colour by changing their values to $X \pm \delta X, Y \pm \delta Y$ and $Z \pm \delta Z$. Using this expedient it is possible to calculate $c_1 \pm \delta c_1, c_2 \pm \delta c_2, c_3 \pm \delta c_3$. The calculation uses known mathematical principles and does not require to be described here.

Using the first constants to be stored in the database it has been found possible to make accurate predictions of dye mixtures necessary to provide or to match specific target colours in about 70% of cases. This is a considerable advance on known methods of dye mixture prediction where the success rate lies between 40% and 60%. However using the feedback principle described it has been found in many production tests that dye mixtures to match given colours may be predicted with accuracies approaching closely and in many cases reaching 100%. This means that the dyeing of large batches of material can be safely put in hand without requiring any test dyeings beforehand or continual checks from the dyehouse. The method makes full allowance initially, mainly by the use of the two constants for each dye at each wavelength, for interaction of the dyes with one another and, with the substrate and the feedback operation, ensures that large scale dyeing can continue despite changes in the dyes themselves and/or changes in the dyeing techniques employed.

Whilst a systematic, laboratory approach may be used as described, in practice, since in any commercial dyehouse, many different colours are being processed over even relatively short time periods, the systematic approach may be dropped in favour of ad hoc measurements carried out on production dyeings, using, if necessary, a systematic approach to "fill in" in regard to colours not well represented in the commercial operations.

In any event, the technique disclosed herein, once a reasonably adequate database has been compiled, is clearly superior to prior art procedures and one can, using it, with reasonable confidence predict a dye mixture that will yield, with reasonable accuracy, a brown dyeing for example, from data primarily compiled on the basis of a green dyeing.

What is claimed is:

1. A method for making a dye mixture to produce a target colour on a given substrate, comprising the steps of:

a) measuring reflectance values $R_T(\lambda_i)$ of the target colour $\lambda$ at a plurality of wavelengths $\lambda_i$, i=1, 2, ... n;

b) measuring reflectance values $R_S(\lambda_i)$ of the substrate s at the same wavelengths $\lambda_i$;

c) forming a set of concentrations $c_j$ of M dyes, j=1, 2, ... M from a database of N dyes Dn, n=1, 2, ... N with associated constant $g_n, k_n$;

d) making dye mixtures using the M dyes in the calculated concentrations; the database having been compiled by aa) making dyeings of combinations of the dyes Dn at different concentrations;

bb) measuring the reflectance values R of the dyeings at different wavelengths;

cc) defining a function f(R);

dd) defining a relationship between f(R) and c involving constants g and k; and ee) for each dye Dn determining constants $g_n$, $k_n$ that the calculated values for f(R), c, $g_n$, $k_n$ approximate closely the measured values.

2. A method according to claim 1, in which the function f(R) is the algorithm known as the Kubelka-Munk conversion in which $$f(R) = \frac{(1-R)^2}{2R}.$$

3. A method according to claim 1, in which step ee) is effected by an iterative process.

4. A method according to claim 1, in which the relationship of step ee) is $$f(R) = \frac{gc}{1+kc}.$$

5. A method according to claim 1, in which the function f(R) of step cc) is $$\frac{(1-R)^2}{2R}.$$

6. A method according to claim 1, in which the reflectance values R measured in step bb) are the XYZ values of the colour as defined by the CIE.

7. A method according to claim 1, in which the dyeings are made using concentrations of dyes in combinations as would be conventional in the industry for the dyes in questions.

8. A method according to claim 1, in which the trial dyeings are made systematically.

9. A method according to claim 8, in which he concentrations are varied in steps of 5% for the systematic trial.

10. A method according to claim 1, in which the dyeings are made as commercial dyeings.

11. A method according to claim 10, in which systematic dyeings are made covering colours inadequately covered in the commercial dyeings over a period of data collection.

12. A method according to claim 1, in which the database is revised by reperforming the steps aa) to ee) adding in data from dye mixtures prepared by steps a) to e).

* * * * *